US009338149B2

(12) United States Patent
Moroney (10) Patent No.: US 9,338,149 B2
(45) Date of Patent: May 10, 2016

(54) DLNA/DTCP STREAM CONVERSION FOR SECURE MEDIA PLAYBACK (71) Applicant: General Instrument Corporation, Horsham, PA (US)

(72) Inventor: Paul Moroney, La Jolla, CA (US)

(73) Assignee: ARRIS Enterprises, Inc., Suwanee, GA (US)

(*) Notice: Subject to any disclaimer, the term of this patent is extended or adjusted under 35 U.S.C. 154(b) by 0 days.

(21) Appl. No.: 14/215,848

(22) Filed: Mar. 17, 2014

(65) Prior Publication Data

US 2014/0281481 A1 Sep. 18, 2014

Related U.S. Application Data (60) Provisional application No. 61/801,216, filed on Mar. 15, 2013, provisional application No. 61/817,115, filed on Apr. 29, 2013.

(51) Int. Cl.
*H04L 29/06* (2006.01)
*G06F 21/00* (2013.01)
(Continued)

(52) U.S. Cl.
CPC ............ *H04L 63/0457* (2013.01); *G06F 21/10* (2013.01); *H04L 63/166* (2013.01); *H04N 21/2351* (2013.01); *H04N 21/2381* (2013.01); *H04N 21/23476* (2013.01); *H04N 21/23611* (2013.01); *H04N 21/23895* (2013.01); *H04N 21/234309* (2013.01);
(Continued)

(58) Field of Classification Search
CPC ............ H04L 63/0457; H04N 21/4825; H04N 21/43615; H04N 21/234309; H04N 21/835; H04N 21/41407; H04N 21/4147; H04N 21/26258; H04N 21/4353; H04N 21/23476; H04N 21/63345; H04N 21/64322; H04N 21/26613
See application file for complete search history.

(56) References Cited

U.S. PATENT DOCUMENTS 5,603,012 A * 2/1997 Sotheran ................ 712/208
5,748,642 A * 5/1998 Lesmeister ............. 714/724
(Continued)

FOREIGN PATENT DOCUMENTS

WO 2012/129549 A1 9/2012

OTHER PUBLICATIONS

PCT Search Report & Written Opinion, RE: Application #PCT/US2014/030420; dated Aug. 5, 2014.
(Continued)

*Primary Examiner* — Lisa Lewis
(74) *Attorney, Agent, or Firm* — Thomas A. Ward (57) ABSTRACT

A process for converting a DTCP-IP transport stream into HLS format, comprising receiving an encrypted DTCP-IP transport stream comprising DTCP frames at a secondary device from a source device, with each of the plurality of DTCP frames comprising encrypted 16-byte portions, forming chunks from the DTCP frames by grouping encrypted 16-byte portions into a chunk, adding HLS padding bytes to the end of each chunk and encrypting the HLS padding bytes to form an encrypted chunk, loading each of the encrypted chunks and a playlist to a media proxy server at the secondary device, loading a DTCP key onto a security proxy server, and providing the playlist, each of the encrypted chunks, and the DTCP key to a native media player on the secondary device, such that the native media player follows the playlist to decrypt the encrypted chunks using the DTCP key and plays back the chunks.

10 Claims, 7 Drawing Sheets

(51) Int. Cl.

| | |
|---|---|
| *H04N 21/2343* | (2011.01) |
| *H04N 21/2347* | (2011.01) |
| *H04N 21/235* | (2011.01) |
| *H04N 21/236* | (2011.01) |
| *H04N 21/2381* | (2011.01) |
| *H04N 21/2389* | (2011.01) |
| *H04N 21/258* | (2011.01) |
| *H04N 21/262* | (2011.01) |
| *H04N 21/266* | (2011.01) |
| *H04N 21/41* | (2011.01) |
| *H04N 21/414* | (2011.01) |
| *H04N 21/4147* | (2011.01) |
| *H04N 21/434* | (2011.01) |
| *H04N 21/435* | (2011.01) |
| *H04N 21/436* | (2011.01) |
| *H04N 21/4367* | (2011.01) |
| *H04N 21/4385* | (2011.01) |
| *H04N 21/4402* | (2011.01) |
| *H04N 21/4405* | (2011.01) |
| *H04N 21/4408* | (2011.01) |
| *H04N 21/482* | (2011.01) |
| *H04N 21/6334* | (2011.01) |
| *H04N 21/643* | (2011.01) |
| *H04N 21/835* | (2011.01) |
| *G06F 21/10* | (2013.01) |

(52) U.S. Cl.
CPC .. *H04N 21/25816* (2013.01); *H04N 21/26258* (2013.01); *H04N 21/26613* (2013.01); *H04N 21/4126* (2013.01); *H04N 21/4147* (2013.01); *H04N 21/41407* (2013.01); *H04N 21/4346* (2013.01); *H04N 21/4353* (2013.01); *H04N 21/4367* (2013.01); *H04N 21/43615* (2013.01); *H04N 21/43853* (2013.01); *H04N 21/4405* (2013.01); *H04N 21/4408* (2013.01); *H04N 21/440218* (2013.01); *H04N 21/4825* (2013.01); *H04N 21/63345* (2013.01); *H04N 21/64322* (2013.01); *H04N 21/835* (2013.01); *G06F 2221/0706* (2013.01); *G06F 2221/0784* (2013.01)

(56) References Cited

U.S. PATENT DOCUMENTS

| | | | |
|---|---|---|---|
| 6,690,683 B1 * | 2/2004 | Brunheroto et al. | 370/542 |
| 8,792,643 B1 * | 7/2014 | Galligan et al. | 380/262 |
| 2003/0188182 A1 | 10/2003 | Sato et al. | |
| 2010/0118929 A1 * | 5/2010 | Miki | 375/224 |
| 2012/0140645 A1 | 6/2012 | Bonta et al. | |
| 2012/0170741 A1 * | 7/2012 | Chen et al. | 380/210 |
| 2012/0185693 A1 * | 7/2012 | Chen et al. | 713/168 |
| 2012/0284802 A1 | 11/2012 | Hierro et al. | |
| 2013/0067109 A1 * | 3/2013 | Dong et al. | 709/231 |
| 2013/0132398 A1 * | 5/2013 | Pfeifle | 707/745 |
| 2014/0052744 A1 * | 2/2014 | Anderson et al. | 707/756 |

OTHER PUBLICATIONS

"Digital Transmission Content Protection Specification Revision 1.7", Dec. 4, 2011, retrieved from the Internet at URL<http://www.dtcp.com/documents/dtcp/info-20111201-dtcp-v1-rev-1-p-7.pdf> on Jul. 21, 2014.

R. Pantos, et al., "HTTP Live Streaming: draft-pantos-http-live-streaming-10", Internet Draft, Apple Inc., Oct. 15, 2012, 37 pgs.

"Best Practices for Creating and Deploying HTTP Live Streaming Media for the iPhone and iPad", Technical Note TN2224, retrieved from URL <http://developer.apple.com/library/ios/#technotes/tn2224/_index.html> on Nov. 4, 2014, 11 pgs.

"HTTP Live Streaming Overview", retrieved from URL <https://developer.apple.com/library/mac/#documentation/NetworkingInternet/Conceptual/StreamingMediaGuide/Introduction/Introduction.html> on Nov. 4, 2014,.

* cited by examiner

DLNA/DTCP STREAM CONVERSION FOR SECURE MEDIA PLAYBACK

CLAIM OF PRIORITY

This application claims priority under 35 U.S.C. §119(e) from earlier filed U.S. Provisional Application Ser. No. 61/801,216, filed Mar. 15, 2013, and earlier filed U.S. Provisional Application Ser. No. 61/817,115, filed Apr. 29, 2013, both of which are hereby incorporated by reference.

TECHNICAL FIELD

The present disclosure relates to the field of digital video recording and streaming, particularly a system for securely streaming media content from a digital video recorder to a mobile device.

BACKGROUND

Consumers have come to enjoy accessing media content on-demand on non-television devices, such as mobile phones or tablet computers, by streaming media content over the internet or downloading media content to the device. Consumers also enjoy watching television broadcasts, either in real time or through digital video recorders (DVRs) whereby broadcasts can be recorded and viewed at a later time.

However, it has only recently been common to merge the two media consumption models by allowing recorded content from one device to be streamed or downloaded to another device due to concerns about digital rights management. For instance, equipment such as cable boxes or DVRs have only recently allowed media content, either real time broadcasts or recorded content, to be streamed or downloaded to non-television devices. Although many consumers would enjoy the flexibility of being able to choose whether to watch a live or recorded television broadcast on a non-television device, such as if they are not at home but would still like to watch a particular program on their mobile phone while on the go, most cable boxes and DVRs encrypt their content or have other digital rights management schemes in place to prevent unauthorized copying or transfer of media content.

Some systems are under development that would allow copy-protected content from one device can be accessed with authorization on a secondary device, without allowing unrestricted copying of the media content. For example, Digital Transmission Content Protection over Internet Protocol (DTCP-IP) is a scheme that provides for copy protection of media content as it is moved from one device to another device over a data connection. In a DTCP-IP system, a consumer can record television content on a DVR, then stream that recorded content to a smartphone or other device over a wireless internet connection while maintaining the content's copy protection and preventing unauthorized copying.

A device or operating system can be compatible with DTCP-IP if it is secure enough to allow a client application to process media transport streams without allowing users, other applications, or other parts of the system to access clear decrypted media transport streams. By way of a non-limiting example, DTCP-IP can be implemented on Apple® devices that run the iOS® operating system, such as the iPhone® and iPad®, because they have a secure boot chain, allow signed code, natively have a secure HTTP Live Streaming (HLS) player with a root of trust, and allow linking of a secure Software Development Kit (SDK) with obfuscation and white box protection to the secure root of trust, the device certificate, and private key, such as a secure RSA identity.

SUMMARY

What is needed is a process of converting a DTCP-IP media stream received at a remote device from a source device into a format readable by a native media player on the remote device, without allowing other components of the remote device access to the media stream. The DTCP-IP media stream can be decrypted, chunked, and re-encrypted to be playable by the remote devices native media player, or the DTCP-IP media stream can be divided into chunks without decryption by adding HLS padding bytes and/or replacing DTCP-IP padding bytes with HLS padding bytes.

In one embodiment, the present disclosure provides for a process for converting a DTCP-IP transport stream into HLS format, comprising receiving an encrypted DTCP-IP transport stream at a secondary device from a source device, the encrypted DTCP-IP transport stream comprising a plurality of DTCP frames, each of the plurality of DTCP frames comprising a plurality of encrypted 16-byte portions, forming chunks from one of the plurality of DTCP frames by grouping some number of its plurality of encrypted 16-byte portions into a chunk, adding HLS padding bytes to the end of the chunk and encrypting the HLS padding bytes, such that the chunk and the encrypted HLS padding bytes form an encrypted HLS chunk, loading each of the encrypted HLS chunks, and a playlist of the encrypted HLS chunks, to a media proxy server at the secondary device, loading a DTCP key onto a security proxy server at the secondary device, the DTCP Key having been derived from information obtained from the source device, and providing the playlist, each of the encrypted HLS chunks, and the DTCP key to a native media player on the secondary device, such that the native media player follows the playlist to decrypt the encrypted HLS chunks using the DTCP key and plays back the HLS chunks.

BRIEF DESCRIPTION OF THE DRAWINGS

Further details of the present invention are explained with the help of the attached drawings in which.

DETAILED DESCRIPTION

Figure 1:
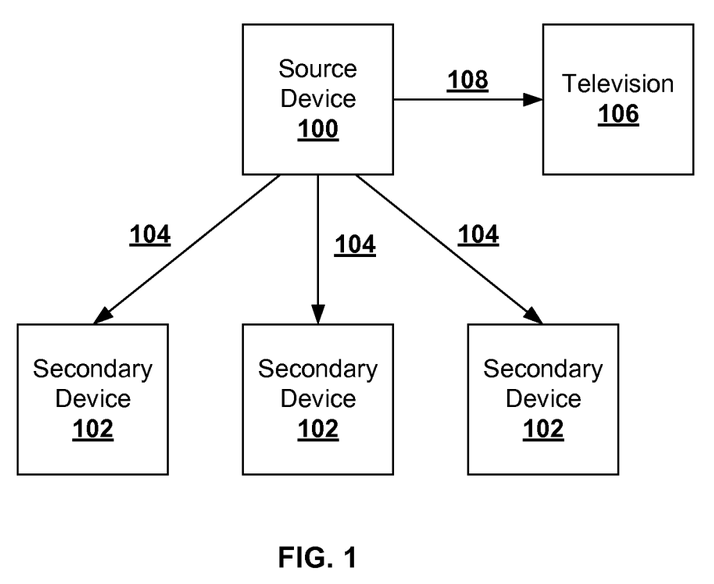
FIG. 1 depicts a system for providing media content from a source device to one or more secondary devices over a network.

FIG. 1 depicts a system for providing media content from a source device 100 to one or more secondary devices 102 over a network 104. The source device 100 can be a DVR, cable box, home media server, or any other source that receives and/or stores media content. The source device 100 can receive and/or prepare media content for viewing on one or more secondary devices 102 over a network 104, such as a wireless or wired data connection, internet connection, and/or local network. A secondary device 102 can be a mobile device such as a smartphone, tablet computer, computer, or any other device. In some embodiments, the source device 100 can additionally and/or alternately provide the media content for viewing on one or more televisions 106 or monitors through a direct connection 108 between the source device and television 106, such as a coaxial cable or HDMI cable.

Figure 2:
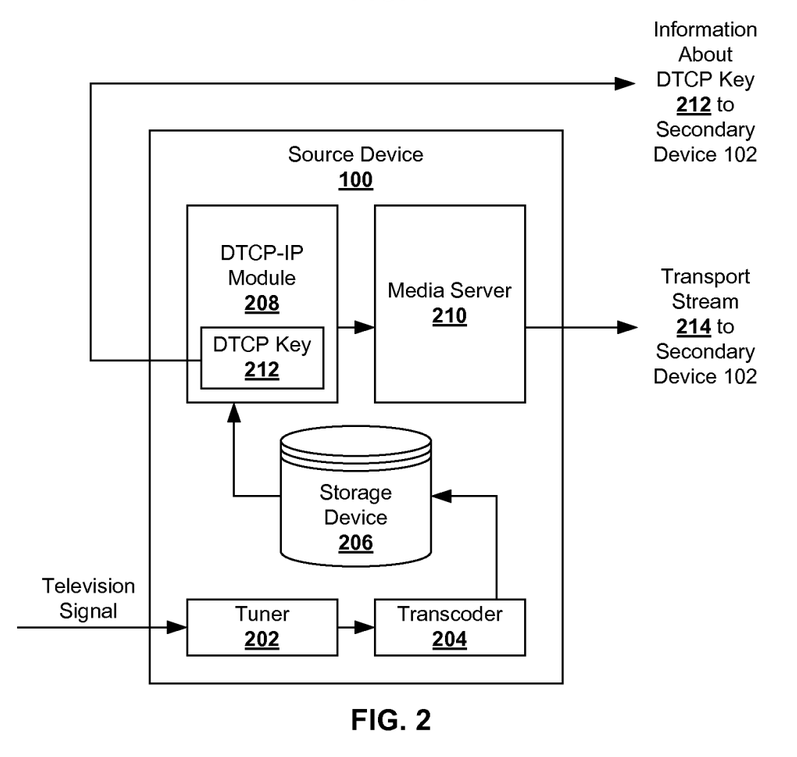
FIG. 2 depicts an exemplary embodiment of a source device.

FIG. 2 depicts an exemplary embodiment of a source device 100. In some embodiments, the source device 100 can comprise one or more tuners 202, transcoders 204, storage device 206, a DTCP-IP module 208, and/or a media server 210.

A tuner 202 can be configured to receive media content, such as a television broadcast received through a cable or satellite connection. Media content received by the tuner 202 can be transcoded by a transcoder 204 into a digital format that can be stored on a storage device 206 as a recording. The storage device 206 can be memory, such as a hard drive, flash memory, random access memory, or any other type of memory. In some situations and/or embodiments, the recorded media content can be viewed as soon as it is recorded, which a viewer can perceive as a substantially live broadcast that allows the recorded media content to be paused or rewound. In other situations and/or embodiments, the recorded media content can be viewed at a later time, with options for live viewing, pausing, rewinding, and/or fast-forwarding. The recorded media content can be viewed on a television 106 directly connected to the source device 100, or on a non-television secondary device 102 in communication with the source device 100 over a network 104 as will be discussed below. In some embodiments however the storage device 206 can be optional or a temporary buffer, such that video content received at a tuner 202 is passed directly to the DTCP-IP Module 208.

Figure 6A:
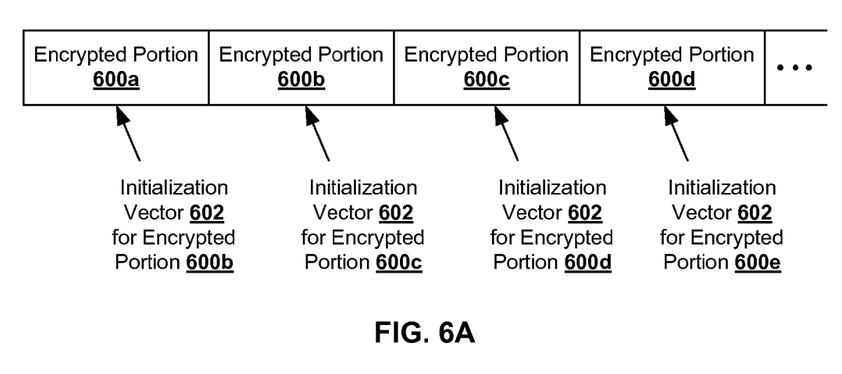
FIG. 6A depicts exemplary portions of media content after they have been encrypted by the DTCP-IP Module of a Source Device.
Figure 6B:
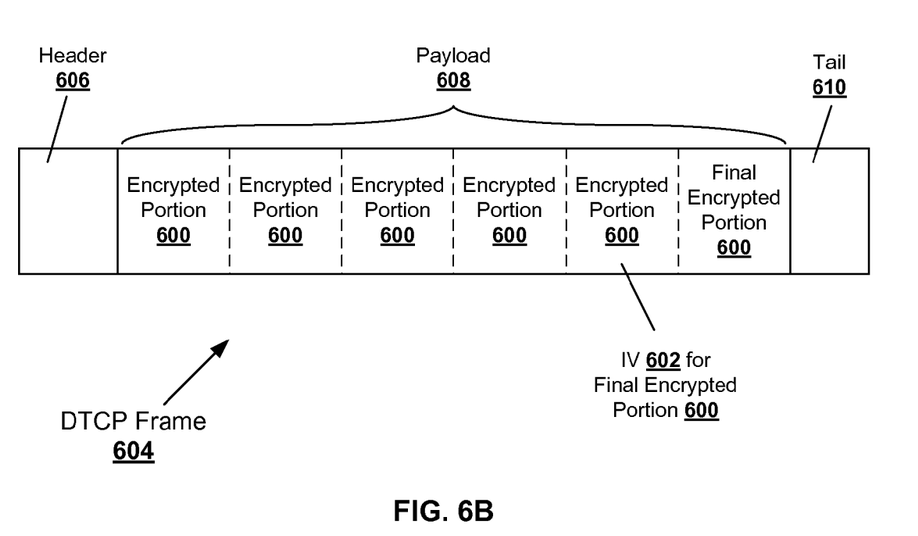
FIG. 6B depicts an exemplary embodiment of a DTCP Frame created during encapsulation of a transport stream.

For viewing on a secondary device 102, recorded media content can be retrieved from the storage device 206 and passed to the DTCP-IP Module 208, which can encrypt the media content using a Digital Transmission Content Protection over Internet Protocol (DTCP-IP) scheme. A DTCP-IP scheme can provide for copy protection of media content, such as a recorded broadcast, as it is transferred from one device to another device over a data connection. The DTCP-IP Module 208 can encrypt the media content with a DTCP Key 212. The DTCP-IP Module 208 can provide information about the DTCP Key 212 to one or more secondary devices 102 from which the secondary device 102 can derive the DTCP Key 212, as will be discussed below. The DTCP-IP Module 208 can also encapsulate the encrypted DTCP-IP broadcast into a transport stream 214 using a container format. By way of a non-limiting example, the DTCP-IP broadcast can be encapsulated into an MPEG transport stream. Encryption and encapsulation of the media content into a transport stream 214 by the DTCP-IP Module 208 will be discussed further with reference to FIG. 6 below.

A transport stream encrypted and encapsulated by the DTCP-IP Module 208 can be passed to a Media Server 210. The Media Server 210 can, upon receiving a request from a secondary device 102, distribute the transport stream 214 to the requesting secondary device 102 over a network 104, such as the internet, local wired or wireless data network, or any other network. By way of a non-limiting example, the Media Server 210 can be a server certified by the Digital Living Network Alliance (DLNA server).

Figure 3:
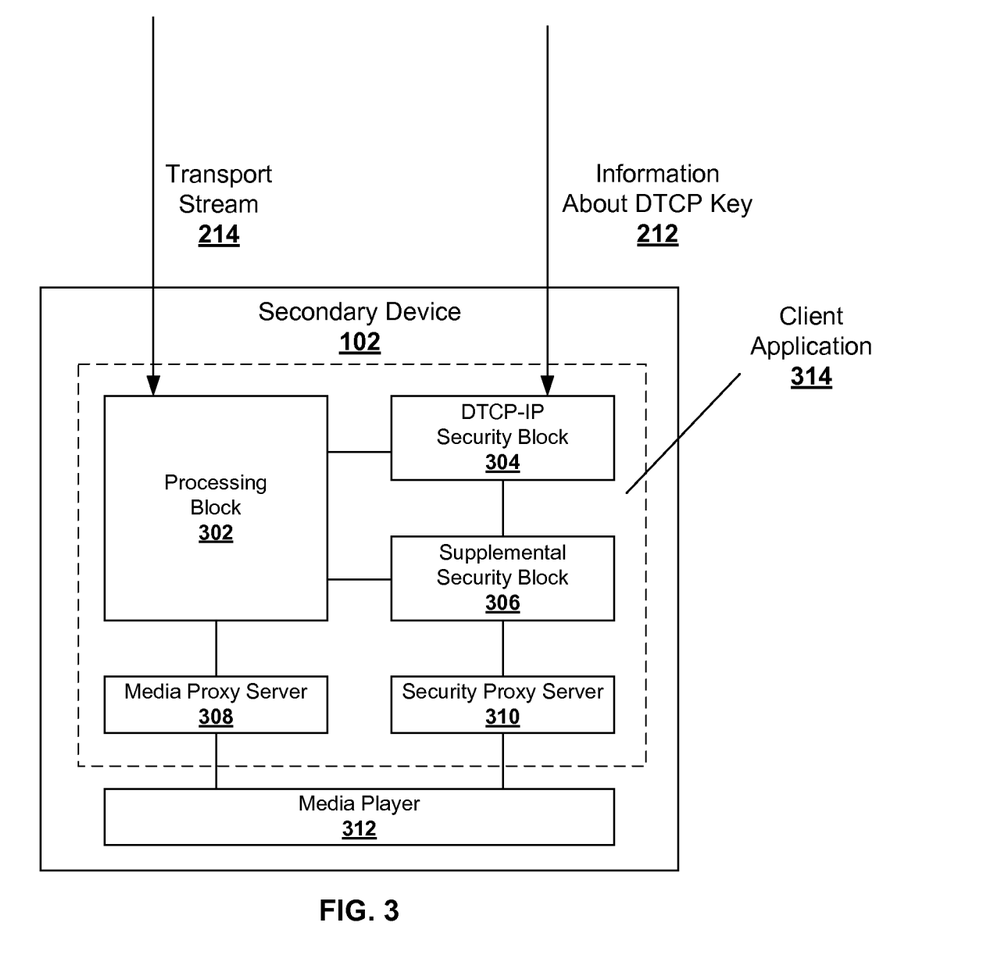
FIG. 3 depicts an exemplary embodiment of a secondary device.

FIG. 3 depicts an exemplary embodiment of a secondary device 102. A secondary device 102 can comprise a Processing Block 302, a DTCP-IP Security Block 304, a Supplemental Security Block 306, a Media Proxy Server 308, a Security Proxy Server 310, and/or a Media Player 312. In some embodiments, the Processing Block 302, DTCP-IP Security Block 304, Supplemental Security Block 306, Media Proxy Server 308, and Security Proxy Server 310 can be provided by and/or operate within a client application 314 running on the secondary device 102, while the Media Player 312 can be a secure media player native to the secondary device's operating system, as shown in FIG. 2. By way of a non-limiting example, the iOS® operating system used by some Apple® devices can have a native secure HTTP Live Streaming (HLS) player that can be used as the Media Player 312. In some embodiments, the client application 314 can be run in a secure manner such that most data is processed and kept within the client application 314 without providing other hardware or software components of the Secondary device 102 with access to that data, except the Media Player 312 as will be described below. By way of a non-limiting example, the iOS® operating system used by some Apple® devices includes elements such as a secure boot chain, signed code, a secure RSA identity, and device certificates that can assist in securely running the client application 314.

Figure 4:
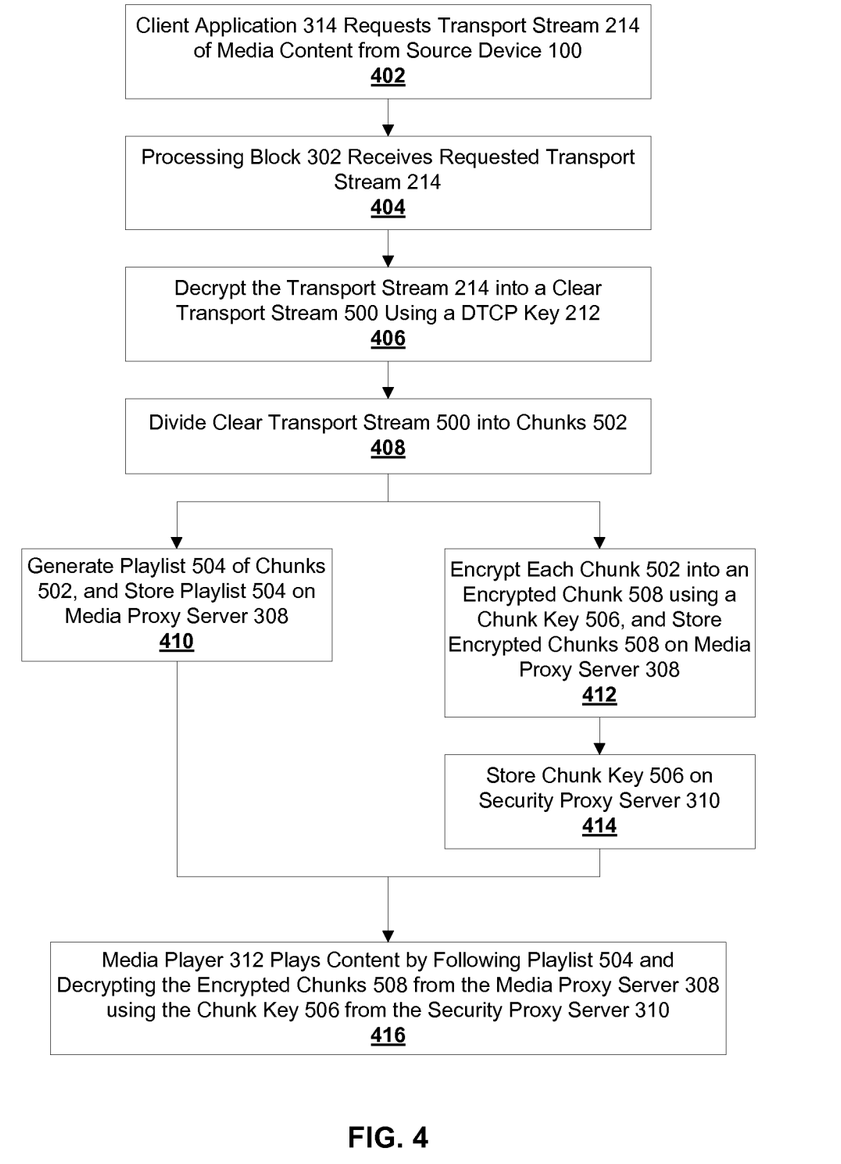
FIG. 4 depicts a first process for receiving and converting a transport stream for playback in Media Player on a secondary device.
Figure 5:
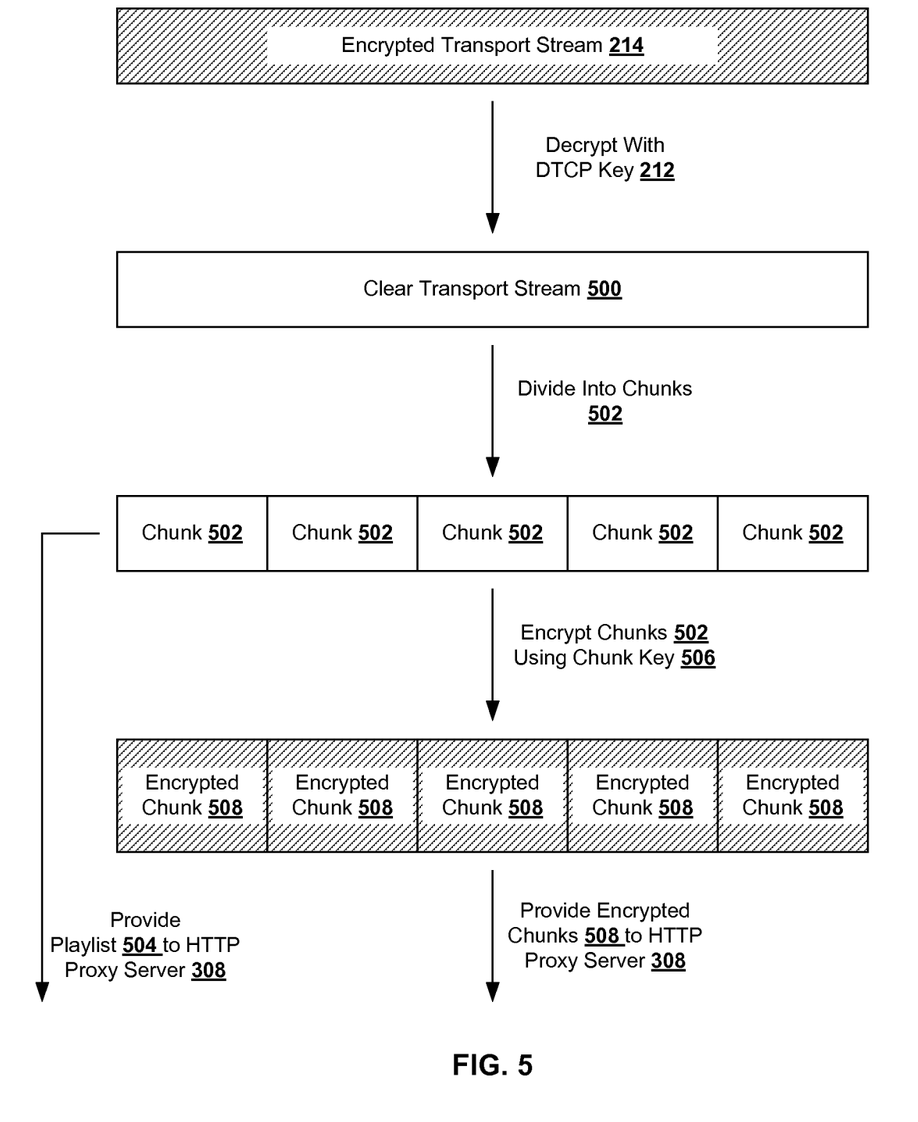
FIG. 5 depicts elements used during the steps of FIG. 4 during conversion of a received transport stream into a format playable on the Media Player.

FIG. 4 depicts a first process for receiving and converting a transport stream 214 for playback in Media Player 312 on a secondary device 102. FIG. 5 depicts elements used during the steps of FIG. 4 during conversion of the received transport stream 214 into a format playable on the Media Player 312.

At step 402, a client application 314 running on a secondary device 102 can request a transport stream 214 from a Media Server 210 on a source device 100 over a network 104. As discussed above, the transport stream 214 can have been encrypted by a DTCP-IP Module 208 with a DTCP-IP copy protection scheme using a DTCP Key 212. The transport stream 214 can also have been encapsulated by the DTCP-IP Module 208 into a container format, such as the DTCP container for an MPEG transport stream.

At step 404, a Processing Block 302 within the client application 314 can receive the requested transport stream 214 from the Media Server 210 over the network 104. In some embodiments, the client application 314 can buffer the transport stream 214 as it is received until enough data has been received to begin processing. In some embodiments, the Processing Block 302 can also de-encapsulate the transport stream 214.

At step 406, the Processing Block 302 can decrypt the transport stream 214 using the DTCP Key 212 that was previously used to encrypt it by the Source Device's DTCP-IP Module 208, such that the transport stream 214 is decrypted into a clear, unencrypted, transport stream 500, as shown in FIG. 5. The Processing Block 302 can obtain the DTCP Key 212 from the DTCP-IP Security Block 304 in the secondary device 102. The DTCP-IP Security Block 304 can have previously obtained information about the DTCP Key 212 from the Source Device 100 sufficient to derive or reconstitute the DTCP Key 212 within the client application 314.

In some embodiments, information about DTCP Key 212 used to encrypt media streams by a DTCP-IP Module 208 within a particular source device 100 can be distributed to a DTCP-IP Security Block 304 within each secondary device 102 that has been authorized to access streams from that particular source device 100, such that the DTCP-IP Security Block 304 or other portion of the client application 314 can derive or reconstitute the DTCP Key 212. In some embodiments, a secondary device 102 and/or client application 314 can be authorized to access streams from a particular source device 100 by associating the secondary device 102 or client application 314 with an authorization identifier, such as a subscriber account, user identifier, member identifier, or any other identifier. By way of a non-limiting example, a subscriber to a cable television service can install a source device 100 as a cable box and/or DVR connected to a television 106 in the subscriber's home, and the DTCP-IP Module 208 in the source device 100 can be linked to the subscriber's account. The cable subscriber can also sign into his account through a client application 314 on a secondary device 102 such as a smartphone to authorize the secondary device 102 to receive streams from the source device 100 linked to his account, as both are linked to the subscriber's account. In this example, information about the DTCP Key 212 used by the DTCP-IP Module 208 in the subscriber's source device 100 can be distributed to DTCP-IP Security Blocks 304 in each secondary device 102 associated with the subscriber, such that any secondary device 102 associated with the subscriber can derive the DTCP Key 212 and decrypt content that was encrypted by the source device 100 associated with the subscriber.

At step 408, the clear transport stream 500 can be processed and divided into chunks 502. In some embodiments, the chunks 502 can be segments of the clear transport stream 500 of a substantially equal length of time. By way of a non-limiting example, in some embodiments each chunk 502 can be a substantially 5 second long portion of the clear transport stream 500. In other embodiments, each chunk 502 can be substantially 1 second long, 10 seconds long, or be a portion of the clear transport stream 500 of any other desired length of time.

In some embodiments, prior to dividing the clear transport stream 500 into chunks 502, the clear transport stream 500 can be processed to find Program Clock References (PCRs) within the clear transport stream 500. The client application 314 can examine the clear transport stream 500 for the Packet Identifiers (PIDs) of its Program Association Table (PAT) and Program Map Tables (PMT) as well as its Program Clock References (PCRs). The Program Association Table (PAT) can list all programs available in the clear transport stream 500. Each Program Map Table (PMT) can describe information about a single program listed on the Program Association Table (PAT). Program Clock References (PCRs) can be included throughout the clear transport stream 500, such that different components of the clear transport stream 500 can be synchronized. By way of a non-limiting example, PCRs can be included within a clear transport stream 500 at least every 100 ms, such that audio and video tracks within the clear transport stream 500 can be synchronized according to the PCRs. In some embodiments, the PCRs of the clear transport stream 500 can be used, at least in part, to divide it into chunks 502 of substantially equal lengths of time, as the PCRs appear at regular intervals throughout the clear transport stream 500. By way of a non-limiting example, PCRs can be used to estimate the clear transport stream's bitrate, and can thus be used to determine how many bits should be included within each chunk 502.

In alternate embodiments, processing and chunking the clear transport stream 500 can be performed without examining the clear transport stream 500 for PCRs. By way of a non-limiting example, in some embodiments the client application 314 can determine or be informed of the bitrate of the clear transport stream 500. In situations in which the client application 314 determines or is informed that the clear transport stream 500 has a constant bitrate, the client application 314 can divide the clear transport stream 500 into chunks 502 of substantially equal lengths of time by counting bits and creating chunks 502 of equal data size. In other situations in which the bitrate is variable but an average bitrate can be determined from some or all of the clear transport stream 500, chunks 502 of substantially equal lengths of time can be created by estimating substantially equal lengths of time according to the average bitrate. By way of a non-limiting example, a beginning section of the clear transport stream, such as the first 10 seconds, can be examined to find its average bitrate, and that average bitrate can be used as an estimated average bitrate for the rest of the clear transport stream 500. By way of another non-limiting example, an average bitrate can be estimated by dividing the total data size of the clear transport stream 500 by its total duration. In some of these situations in which an average bitrate is used, the length of time for chunks 502 can be selected as longer than in other embodiments, as longer chunks 502 can in some cases be more likely to come closer to an average overall bitrate. In still other embodiments, especially those where the timing is driven approximately by the server, in real time, a clock can be used to time preselected time intervals, and at each time interval a chunk 502 can be broken out from the clear transport stream 500.

At step 410, a playlist 504 describing the identity and sequence of the chunks 502 can be generated as the chunks 502 are created during step 408, and this playlist 504 can be stored on a Media Proxy Server 308 within the secondary device 102. The Media Proxy Server 308 can be a local HTTP proxy server within the secondary device 102. In some embodiments, the playlist 504 can be a rolling .m3u, .m3u8, or other type of playlist that comprises information describing the chunks 502. In some embodiments, the playlist 504 can further comprise an EXT-INF tag that describes the duration of the chunks 502. By way of a non-limiting example, when the length of each chunk 502 was set at 10 seconds, the EXT-INF of the playlist 504 can be set to 10 seconds. As described above, the duration of the chunks 502 described by the EXT-INF tag can be determined by using PCRs, counting bits in a constant bitrate clear transport stream 500, counting bits after finding an average bitrate for the clear transport stream 500, and/or using a real-time clock to divide out chunks 502 at predetermined intervals of time within the clear transport stream 500.

At step 412, the Processing Block 302 can encrypt each chunk 502 with a Chunk Key 506 into an encrypted chunk 508, and then store each encrypted chunk 508 on the Media Proxy Server 308. In some embodiments, each chunk 502 can be encrypted with the same Chunk Key 506, while in other embodiments a sequence of different Chunk Keys 506 can be used to encrypt each chunk 502. In some embodiments, one or more Chunk Keys 506 used to encrypt the chunks 502 can be different than the DTCP Key 212, such as a Chunk Key 506 provided to the Processing Block 302 by the Supplemental Security Block 306 or DTCP-IP Security Block 304, and/or generated by the Processing Block 302. By way of a non-limiting example, the Supplemental Security Block 306 can generate and provide one or more new keys to the Processing Block 302 for use as Chunk Keys 506. In alternate embodiments, a Chunk Key 506 can be the same as the DTCP Key 212. By way of non-limiting examples, the Processing Block 302 can re-use the copy of the DTCP Key 212 it obtained during step 406 as the Chunk Key 506, or the DTCP-IP Security Block 304 can have provided the DTCP Key 212 it obtained from the Source Device 100 to the Supplemental Security Block 306, such that the DTCP Key 212 can be provided from the Supplemental Security Block 306 to the Processing Block 302 during step 412 to be used as the Chunk Key 506 to encrypt chunks 502 into encrypted chunks 508. In some embodiments, the Processing Block 302 can additionally process Copy Control Information (CCI), rights information, and/or output control, such as CCI received from the DTCP-IP Security Block 304.

At step 414, the one or more Chunk Keys 506 used to encrypt the chunks 502 during step 412 can be hosted on a Security Proxy Server 310 within the secondary device 102. The Security Proxy Server 310 can be a local HTTP proxy server within the secondary device 102, similar to the Media Proxy Server 308. The Supplemental Security Block 306 can provide the one or more Chunk Keys 506 to the Security Proxy Server 310 in addition to providing the Chunk Keys 506 to the Processing Block 302 for use during step 412. In alternate embodiments, the Processing Block 302 can provide the Chunk Keys 506 it used to encrypt the chunks 502 to the Security Proxy Server 310.

At step 416, the Media Player 312 can play the media content received from the Source Device 100. The Media Player 312 can be in communication with both the Media Proxy Server 308 and the Security Proxy Server 310. The Media Player 312 can use the playlist 504 stored on the Media Proxy Server 308 to determine which chunks 502 are to be played back and/or in what order. The Media Player 312 can obtain the encrypted chunks 508 from the Media Proxy Server 308 that correspond to the chunks 502 described by the playlist 504. The Media Player 312 can then obtain the appropriate Chunk Key 506 for each encrypted chunk 508, and can use the Chunk Key 506 to decrypt the encrypted chunk 508 into an unencrypted chunk 502. The unencrypted chunk 502 can then be played and displayed as video on the secondary device. The Media Player 312 can continue this process for each subsequent chunk 502 in the playlist 504 to play back some or all of the requested media content.

In some embodiments, a 2-way SSL connection can exist between the Media Player 312 and the Security Proxy Server 310, such that each Chunk Key 506 can be securely delivered to the Media Player 312. In some embodiments, the 2-way SSL connection between the Media Player 312 and the Security Proxy Server 310 can also allow the Security Proxy Server 310 to check a device certificate maintained by the secondary device 102, and for the Media Player 312 to check a certificate maintained by the Security Proxy Server 310.

In some embodiments, the playlist 504 can include data about each chunk 502 as soon as the chunk 502 is created and/or the process of encrypting the chunk 502 into an encrypted chunk 508 is started, such that the Media Player 312 can be aware of the chunk 502 and begin playback of the chunk 502 as soon as possible. Similarly, in some embodiments the encrypted chunk 508 can be transferred to the Media Proxy Server 308 and/or Media Player 312 in small pieces, such that decryption and playback of encrypted chunks 508 can begin as soon as the first piece is received by the Media Player 312. In some situations in which the media content was prerecorded and transcoding of the media content at the source device 100 can occur faster than real-time, the secondary device 102 can attempt to load the beginning of the transport stream 214 at faster than real time speeds to allow chunks 502 to be created, encrypted, transferred, and decrypted as quickly as possible to begin playback as quickly as possible.

FIG. 6A depicts exemplary portions 600 of media content after they have been encrypted by the DTCP-IP Module 208 of a Source Device 100. FIG. 6B depicts an exemplary embodiment of a DTCP Frame 604 created during encapsulation of a transport stream 214.

In some embodiments, the initial encryption of media content into the encrypted transport stream 214 at the source device 100 can be performed by the DTCP-IP Module 208 by sequentially encrypting portions 600 of the media content of a predetermined size, as shown in FIG. 6A. By way of a non-limiting example, the DTCP-IP Module 208 can encrypt media content according to AES-CBC (Advanced Encryption Standard-Cipher-Block Chaining), in which the predetermined size of the portions 600 is 16 bytes. In alternate embodiments any other predetermined size can be used for the portions 600, however for simplicity this disclosure will refer to portions 600 having 16 bytes as used in AES-CBC.

Each portion 600 can be encrypted using an Initialization Vector (IV) 602 in addition to the DTCP Key 212. The first portion 600 can be encrypted using a derived IV 602, however once the first portion 600 has been encrypted, the preceding encrypted portion 600 can be used as the IV 602 to encrypt the next portion 600. By way of a non-limiting example, in the AES-CBC scheme, once a 16 byte portion 600 of media content has been encrypted, that encrypted 16 byte portion 600 can be used as the IV 602 to encrypt the next 16 bytes of the media content.

When the DTCP-IP Module 208 encapsulates the encrypted media content into the transport stream 214, it can segment the encrypted media content into a plurality of DTCP Frames 604. FIG. 6B depicts an exemplary DTCP Frame 604. Each DTCP Frame 604 can be a protected content packet (PCP) comprising a header 606, a payload 608, and a tail 610. The header 606 and tail 610 can comprise informational data about the DTCP Frame 604, while the payload 608 can comprise one or more encrypted portions 600 of the media content. As described above, each encrypted portion 600 within the DTCP Frame's payload data 608, except for the first portion 600, can have been encrypted using the preceding encrypted portion 600 as its IV 602. Thus, the IV 602 for each of these encrypted portions 600 within the payload 608 can be found by finding the immediately preceding encrypted portion 600. The default IV 602 used to encrypt the first portion 600 within the payload 608 can be stored within the DTCP Frame's header 606.

Figure 8A:
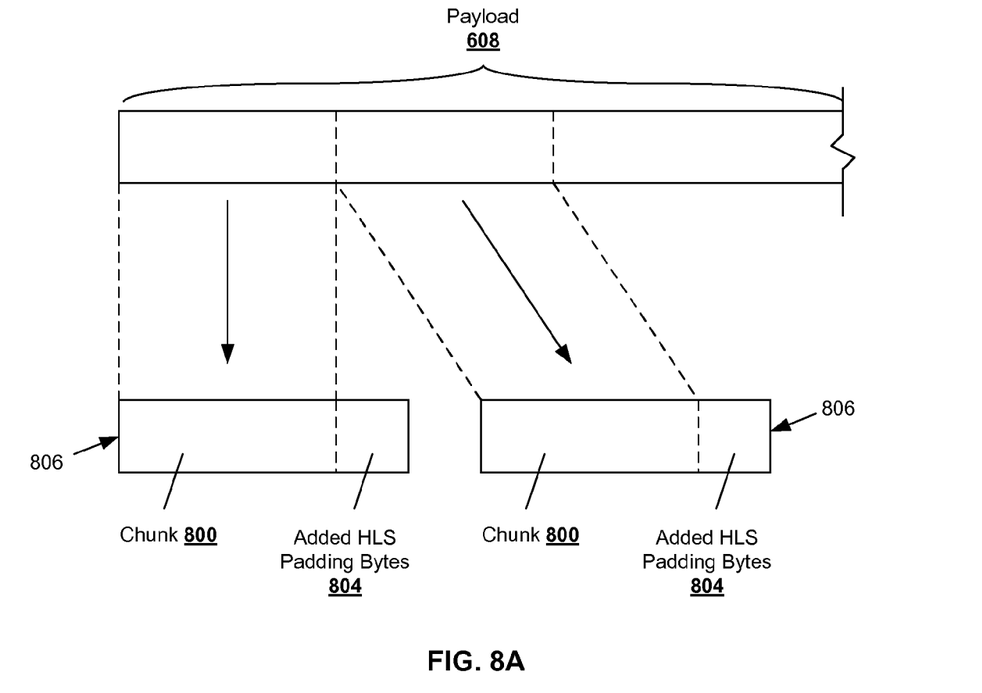
FIG. 8A depicts the conversion of a DTCP Frame into encrypted chunks incorporating HLS padding bytes.

In some situations, the final portion 600 of a payload 608 can comprise one or more DTCP padding bytes 802, as shown at the top of FIG. 8A. In these situations, the final portion 600 of a DTCP Frame 604 can contain less than the predetermined number of bytes from the media content itself, and the remainder of the predetermined number of bytes can be filled with DTCP padding bytes 802 during encryption. By way of a non-limiting example, when the predetermined size of the portions 600 is set at 16 bytes, if the final portion 600 of the payload 608 contains 1 to 15 bytes from the media content, DTCP padding bytes 802 can be used to fill out the remainder of the total 16 bytes.

Figure 7:
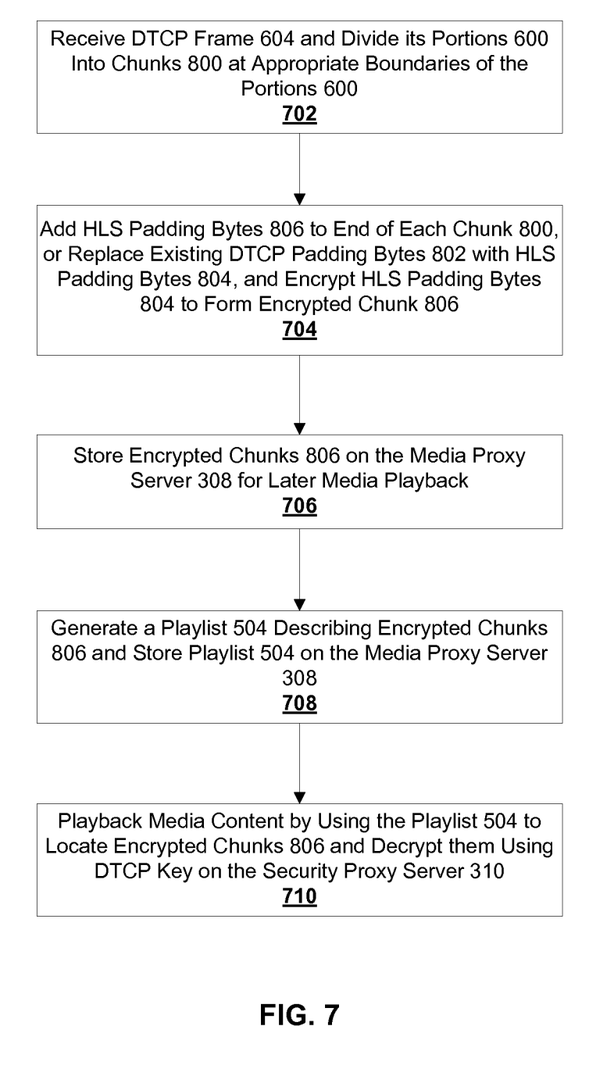
FIG. 7 depicts a second process for receiving and converting a transport stream for playback in Media Player on a secondary device.

FIG. 7 depicts a second process for receiving and converting a transport stream 214 for playback in Media Player 312 on a secondary device 102. The process of FIG. 7 can be used by the client application 314 to convert DTCP Frames 604 into encrypted chunks 806 expected by the Media Player 312. In some embodiments, the DTCP Frames 604 can be broken into smaller chunks 800 that can be padded with padding bytes 804, which are then themselves encrypted, as described below to be used as encrypted chunks 806. Encrypted chunks 806 can be similar to the encrypted chunks 508 that would be generated through the process of FIG. 4.

In some embodiments the format of padding bytes 804 in encrypted chunks 806 that can be decrypted and played by the Media Player 312 of a secondary device are different than the format of the DCTP padding bytes 802 used to fill out portions 600 of DTCP Frames 604. By way of a non-limiting example, the native media player in an Apple® iOS® device is a HLS player. HLS uses encrypted chunks 508 or 806 encrypted with AES-CBC encryption, just as DTCP-IP uses DTCP Frames 604 encrypted with AES-CBC encryption. However, HLS encrypted chunks 508 or 806 and DTCP Frames 604 use different types of padding bytes. By replacing the DTCP padding bytes 802 within a DTCP Frame 604 with substitute HLS padding bytes 804 as shown in FIG. 8A, or appending HLS padding bytes 804 to chunks 800 of the DTCP Frame 604 as shown in FIG. 8B, the DTCP Frame 604 can be converted into HLS format encrypted chunks 806 readable by the HLS player, without the steps of FIG. 4 involving full decryption of the transport stream 214, chunking of the clear transport stream 500, and full re-encryption of individual chunks 502 into encrypted chunks 508.

At step 702, when the client application 314 receives a DTCP Frame 604, it can divide the DTCP Frame 604 into chunks 800, without decrypting the individual portions 600. Each chunk 800 can comprise a number of encrypted portions 600 from the DTCP Frame's payload 608, typically as many as create an N second chunk. By way of a non-limiting example, a DTCP Frame 604 can comprise a plurality of 16-bytes portions 600, and some number of portions 600 can be formed into each chunk 800, such that each chunk 800 has a data size that is a multiple of 16-bytes.

At step 704, padding bytes 804 can be added to the end of each chunk 800 and the added portions can be encrypted to turn the chunk 800 into an encrypted chunk 806, as shown in FIG. 8A. The padding bytes 804 can be in a format expected by the Media Player 312, such that the Media Player 312 can read and playback the DTCP Frame's payload 608. By way of a non-limiting example, the Media Player 312 used in Apple® iOS® devices can be an HLS player that expects to find HLS padding bytes 804 at the end of each encrypted chunk 508, and so the substitute padding bytes 804 can be HLS padding bytes. In some embodiments, a number of padding bytes 804 equal to the size of an individual portion 600 can be added to the end of a chunk 800. By way of a non-limiting example, when the chunk 800 was formed by grouping some number of 16-byte portions 600 out of the DTCP Frame 604, 16 padding bytes 804 can be added to the end of the chunk 800. The added padding bytes 804 can be encrypted with the DTCP Key 212, so that the already-encrypted chunk 800 broken out from the DTCP Frame 604 and the newly added and encrypted padding bytes 804 together form a full encrypted chunk 806.

Figure 8B:
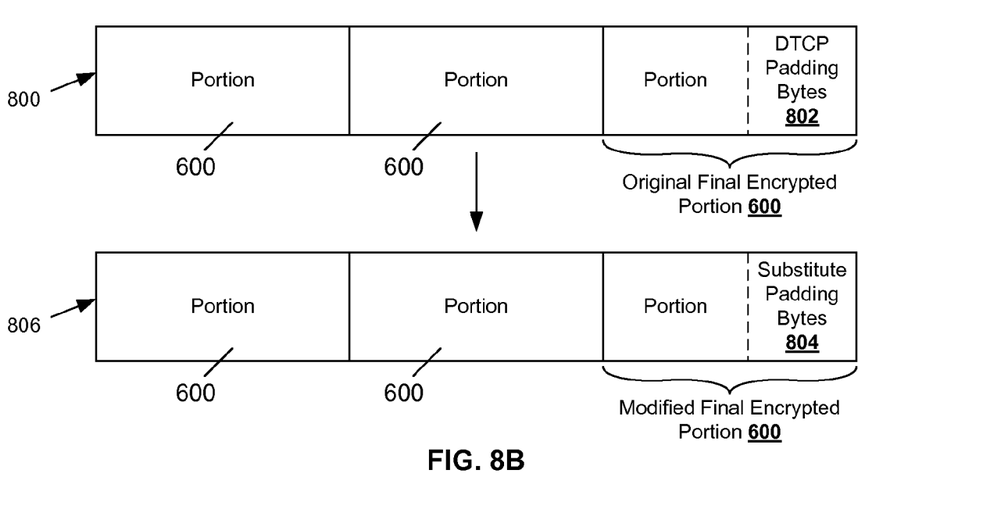
FIG. 8B depicts the substitution of DTCP padding bytes in a chunk created from a DTCP payload's final portion with HLS padding bytes to form an encrypted chunk.

However, in some situations as shown in FIG. 8B, the final encrypted portion 600 of a particular DTCP Frame's payload 608 can include less than the full number bytes from media content, with the remainder filled with DTCP padding bytes 802. When this final encrypted portion 600 is used as part of a chunk 800, that final encrypted portion 600 can be decrypted and its DTCP padding bytes 802 can be removed and replaced with HLS padding bytes 804. By way of a non-limiting example, in the AES-CBC encryption scheme, the final portion 600 of the payload 608 can be the last 16 bytes of the payload 608. The client application 314 can also find the IV 602 for the final portion 600 by finding the portion 600 that immediately precedes the final portion 600 within the payload 608. By way of a non-limiting example, in the AES-CBC encryption scheme, the IV 602 for the final 16 bytes can be found by looking at the 16 bytes that precede the final 16 bytes, as shown in FIG. 6B. The IV 602 for the final portion 600 can be used in conjunction with the DTCP Key 212 to decrypt the final portion 600. As with step 406, the DTCP Key 212 can be provided to the Processing Block by the DTCP-IP Security Block 304. After the final portion 600 has been decrypted, the DTCP padding bytes 802 can be replaced with HLS padding bytes 804. The final portion 600 with the replacement HLS padding bytes 804 can be re-encrypted, such that the overall chunk 800 incorporating that final portion 600 contains HLS padding bytes 804 and can be used as an encrypted chunk 806.

In other situations and/or embodiments, if the final portion 600 of the payload 608 does not contain one or more padding bytes, and was instead exclusively comprised of bytes from the media content, the Processing Block 302 can append an additional portion 600 to the end of the payload 608 that exclusively comprises padding bytes in the format expected by the Media Player 312. By way of a non-limiting example, if the Processing Block 302 discovers after decrypting the final portion 600 that the final portion 600 in the DTCP Frame's payload 608 did not contain any padding bytes, the Processing Block 302 can append an extra portion 600 after the final portion 600 that contains 16 padding bytes in the format expected by the Media Player 312, such that the chunk 800 containing the final portion 600 has a new final portion 600 that is exclusively padding bytes.

At step 706, the encrypted chunks 806, which include HLS padding bytes 804, can be stored on the Media Proxy Server 308.

At step 708, a playlist 504 describing the encrypted chunks 806 can be generated by the Processing Block 302 and stored on the Media Proxy Server 308. The playlist 504 can include keytag definitions that includes the IV 602 for the first portion 600 of each encrypted chunk 806, such that the initial portion 600 of the encrypted chunk 806 can be later decrypted in part with the its IV 602. A derived IV 602 for the first portion 600 of the first encrypted chunk 806 from a DTCP Frame 604 can be obtained from the DTCP Frame's header 606, and the DTCP key 212 while IVs 602 for the first portion 600 of other encrypted chunks 806 can be obtained by looking at the portion 600 that preceded that portion 600 in the DTCP Frame 604 before it was broken out from the DTCP Frame 604. As described in step 410, the playlist 504 can be a rolling .m3u8 playlist or any other type of playlist.

Similarly, as described above, the playlist 504 can also include an EXT-INF value that describes the time duration of the encrypted chunks 806. In some situations and/or embodiments, when the encrypted transport stream 214 is known up front prior to processing to have a constant bitrate, the EXT-INF value can be chosen and the chunk boundaries determined by counting bits of data from the DTCP Frame 604.

In alternate situations and/or embodiments in which the transport stream's bitrate is not known before processing or the bitrate is variable, a selection of portions 600 or complete DTCP Frames 604 at the beginning of the transport stream 214 can be decrypted, such that an average bitrate of the decrypted portions can be determined. That average bitrate and the chosen chunk size in seconds (the EXT-INF value for the playlist 504) can be used to divide the DTCP frame into chunks. By way of a non-limiting example, the first 10 seconds of an encrypted transport stream 214 can be decrypted, the average bitrate of those first 10 seconds can be found, and that average bitrate can be used to estimate the number of bytes to use for each encrypted chunk 806 created from the transport stream 214.

In still other situations and/or embodiments, such as in adaptive streaming situations, the bitrate of a transport stream 214 can be highly variable, such that the stream's bitrate is not known up front and/or an estimate of the average bitrate for the beginning of the transport stream 214 may not hold for the remainder of the transport stream. In these situations, transcoding and streaming of the transport stream 214 from the source device 100 can operate substantially in a push model, in which the source device 100 transcodes and transmits a transport stream 214 to a secondary device 102 substantially in real-time as media content is received at the source device 100. The chunk boundaries in these situations can be determined using a real-time clock and the chosen chunk size in seconds (the EXT-INF values in the playlist 504) to estimate the number of bytes to use for each chunk built from the content in the DTCP Frame 604 as they are received.

At step 710, the Media Player 312 can play back the media content. Similar to the playback steps of FIG. 4, the encrypted chunks 806 and the playlist 504 can be retrieved from the Media Proxy Server 308, and the DTCP Key 212 can be retrieved from the Security Proxy Server 310. The Media Player 312 can use the DTCP Key 212 and IVs 602 to decrypt each portion 600 of the encrypted chunks 806 and play back the decrypted media content.

While as described above, in most situations a DTCP Frame 604 can be longer than is useful for an encrypted chunk 806, and a single DTCP Frame 604 can be broken up into chunks 800, and have HLS padding bytes 804 added or replaced at the ends of chunks 800 to form encrypted chunks 806 playable by the Media Player 312. In other situations, a particular DTCP Frame 604 can be smaller than the desired size of an encrypted chunk 806. By way of a non-limiting example, a DTCP Frame 604 of 1500 bytes can be smaller than the desired size of an encrypted chunk 806. In these situations, a small DTCP Frame 604 can be combined with the beginning of the next DTCP Frame 604. As each individual DTCP Frame 604 can have DTCP padding bytes 802 within its final portion 600, in some embodiments each DTCP Frame 604 can be decrypted and the DTCP padding bytes 802 can be removed (from the first frame) or replaced with substitute padding bytes 804 (for the second frame) before the DTCP Frames 604 are combined into a single encrypted chunk 806.

In some alternate embodiments, elements of the processes of FIG. 4 can be supplemented with steps from FIG. 7 to avoid the re-encryption of chunks 502 into encrypted chunks 508 and instead break the DTCP Frames 604 into encrypted chunks 806, which can in some situations decrease the processing load on the secondary device 102. In these embodiments, an incoming transport stream 214 can be decrypted as described in step 406 to form a clear transport stream 500. That clear transport stream 500 can be examined for its PCRs or other fields, such as to determine the appropriate time duration of each chunk 502 according to the length of time between each PCR in the clear transport stream 500. That length of time can be used as the EXT-INF value in a playlist 504. In these embodiments however, chunking and re-encryption of the clear transport stream 500 can be avoided, and the received DTCP Frames 604 can instead be directly converted into encrypted chunks 806 through the process shown in FIG. 7. By way of a non-limiting example, although the transport stream 214 can be decrypted into the clear transport stream 500 in order to find PCRs and to determine the appropriate time duration of each chunk (the EXT-INF values), chunks 502 are not created and encrypted in these embodiments and instead the process of FIG. 7 can be used to break a DTCP Frame 604 into chunks 800, add or replace padding bytes, and create encrypted chunks 806. Those encrypted chunks 806 can be played back by the Media Player 312.

In some situations, a user of a secondary device 102 can submit instructions to the source device 100 to pause, rewind, fast forward, seek a specific time point within media content, request playback at a different speed, or any request other operation. By way of a non-limiting example, the Media Player 312 can present a graphical user interface to a user, and the user can use that GUI to input commands regarding playback of the media content. The Media Player 312 can send those instructions to the client application 314, which can inform the source device 100 of the requested operation, such as through a DNLA header or action. In these cases, the source device 100 can to produce the transport stream 214 with designated discontinuity points, such that a specific point within the transport stream 214 can be found. In some embodiments, a DNLA signaling layer within a transport stream 214 can signify that the source device 100 has paused transmission or is buffering transmission of the transport stream 214, or that the transport stream 214 is transmitting a completed recording rather than a completed portion of an ongoing recording. The source device 100 can continue generating the transport stream 214 and transfer it to the secondary device 102 at the requested position within the media content, speed of playback, or any other attribute, such that a transport stream 214 continues to be received and processed by the secondary device 102.

By way of a non-limiting example, a user can input a command at the Media Player 312 that the media content be rewound by 30 seconds, and that command can be sent to the source device 100. The source device 100 can then return to a discontinuity point 30 seconds earlier within the transport stream 214, and send the transport stream 214 to the secondary device from that discontinuity point. The secondary device 102 can process the received transport stream 214 as described above, such that encrypted chunks 508 and a playlist 504 are delivered to the Media Player 312 from the new position within the media content as if it were a live stream.

In some embodiments, an entire transport stream 214 can be delivered or loaded onto storage memory within the secondary device 102 from the source device 100. By way of a non-limiting example, a media recording on a source device 100 can be downloaded to a hard drive or memory card in a secondary device 102. In these embodiments, the downloaded transport stream 214 can be played back locally on the secondary device 102 instead of being streamed in real time over a data network from the source device 100.

In these cases, the transport stream 214 loaded onto local storage within the secondary device 102 can be incompatible with the local Media Player 312 unless it is converted into the format expected by the local Media Player 312 through the processes described above. By way of a non-limiting example, a DTCP-IP stream can be incompatible with an HLS stream, but the DTCP-IP stream can be processed through the processes described above, such as those of FIG. 4 and/or FIG. 7, to become compatible with an HLS Media Player 312.

However, the transport stream 214 can be loaded onto the secondary device 102 faster than real-time playback of the media content, such as through a DNLA http GET command. In these embodiments, the encrypted transport stream 214 can be stored up front on the secondary device's local storage, and the processes described above can be performed during playback. Alternatively, the entire locally-stored encrypted transport stream 214 could be converted in the background as CPU cycles are available into a format playable by the Media Player 312. In these embodiments, the secondary device 102 can process the stored transport stream 214 to produce a series of encrypted chunks 508. In some embodiments, the series of encrypted chunks 508 can be stored in a single .ts transport file on the Media Proxy Server 308 or local storage device, and a single playlist 504 can be generated on the Media Proxy Server 308 that describes the location of each encrypted chunk 508 within the .ts transport file containing all the encrypted chunks 508. By way of a non-limiting example, the playlist 504 can represent the entire duration of the media content, including an END_TAG to designate the end of playback, and the playlist 504 can include BYTE_OFFSET parameters to indicate the locations of each encrypted chunk 508 within the single .ts transport file.

In some of these embodiments, one or more Chunk Keys 506 or the DTCP Key 212, and/or associated certificates, output control bits, rights information, or any other information can be stored on the same local storage device or memory card as the .ts transport file containing the encrypted chunks 508.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed:

1. A process for converting a DTCP-IP transport stream into HLS format, comprising:
    receiving an encrypted DTCP-IP transport stream at a secondary device from a source device, said encrypted DTCP-IP transport stream comprising a plurality of DTCP frames, each of said plurality of DTCP frames comprising a plurality of encrypted 16-byte portions;
    forming chunks from one of said plurality of DTCP frames by grouping one or more of its plurality of encrypted 16-byte portions into a chunk;
    adding HLS padding bytes to the end of said chunk and encrypting said HLS padding bytes, such that said chunk and the encrypted HLS padding bytes form an encrypted chunk;
    loading each of said encrypted chunks, and a playlist of said encrypted chunks, to a media proxy server at said secondary device;
    loading a DTCP key onto a security proxy server at said secondary device, said DTCP Key having been obtained from said source device; and
    providing said playlist, each of said encrypted chunks, and said DTCP key to a native media player on said secondary device, such that said native media player follows said playlist to decrypt said encrypted chunks using said DTCP key and plays back said chunks.

2. The process of claim 1, wherein one of said chunks contains a final 16 byte portion from one of said plurality of DTCP frames, and said process further comprises:
    decrypting said final 16 byte portion;
    replacing DTCP padding bytes within said final 16 byte portion with HLS padding bytes; and
    re-encrypting said final 16 byte portion to form one of said encrypted chunks.

3. The process of claim 1, wherein said playlist includes a value describing the time length of each encrypted chunk.

4. The process of claim 3, wherein said time length is determined by decrypting some or all of said encrypted DTCP-IP transport stream to form a clear transport stream, finding PCRs within said clear transport stream, and determining said time length at least in part by the length of time between PCRs in said clear transport stream.

5. The process of claim 1, further comprising finding an initialization vector for said chunk by finding a preceding 16-byte portion that immediately preceded the 16-byte portion used as the first portion in said chunk within said DTCP frame, and using that preceding 16-byte portion as said initialization vector for said chunk.

6. The process of claim 5, further comprising including said initialization vector for said chunk in said playlist.

7. A process for converting a DTCP-IP transport stream into HLS format, comprising:
    receiving an encrypted DTCP-IP transport stream at a secondary device from a source device, said encrypted DTCP-IP transport stream comprising a plurality of DTCP frames, each of said plurality of DTCP frames comprising a plurality of encrypted 16-byte portions;
    forming chunks from one of said plurality of DTCP frames by grouping one or more of its plurality of encrypted 16-byte portions into a chunk;
    adding HLS padding bytes to the end of said chunk and encrypting said HLS padding bytes, such that said chunk and the encrypted HLS padding bytes form an encrypted chunk;
    loading each of said encrypted chunks, and a playlist of said encrypted chunks, to a media proxy server at said secondary device;
    loading a DTCP key onto a security proxy server at said secondary device, said DTCP Key having been obtained from said source device; and
    providing said playlist, each of said encrypted chunks, and said DTCP key to a native media player on said secondary device, such that said native media player follows said playlist to decrypt said encrypted chunks using said DTCP key and plays back said chunks,
    wherein said playlist includes a value describing the time length of each encrypted chunk, and
    wherein said clear transport stream has a constant bitrate, and said time length is determined by the number of bits for each chunk, as found by counting bits from said constant bitrate.

8. A process for converting a DTCP-IP transport stream into HLS format, comprising:
    receiving an encrypted DTCP-IP transport stream at a secondary device from a source device, said encrypted DTCP-IP transport stream comprising a plurality of DTCP frames, each of said plurality of DTCP frames comprising a plurality of encrypted 16-byte portions;
    forming chunks from one of said plurality of DTCP frames by grouping one or more of its plurality of encrypted 16-byte portions into a chunk;
    adding HLS padding bytes to the end of said chunk and encrypting said HLS padding bytes, such that said chunk and the encrypted HLS padding bytes form an encrypted chunk;
    loading each of said encrypted chunks, and a playlist of said encrypted chunks, to a media proxy server at said secondary device;
    loading a DTCP key onto a security proxy server at said secondary device, said DTCP Key having been obtained from said source device; and providing said playlist, each of said encrypted chunks, and said DTCP key to a native media player on said secondary device, such that said native media player follows said playlist to decrypt said encrypted chunks using said DTCP key and plays back said chunks, wherein said playlist includes a value describing the time length of each encrypted chunk, and wherein said clear transport stream has a variable bitrate, and said time length is determined by the number of bits for each chunk, as found from an average bitrate for said clear transport stream by counting bits from said average bitrate.

9. A process for converting a DTCP-IP transport stream into HLS format, comprising:

receiving an encrypted DTCP-IP transport stream at a secondary device from a source device, said encrypted DTCP-IP transport stream comprising a plurality of DTCP frames, each of said plurality of DTCP frames comprising a plurality of encrypted 16-byte portions;

forming chunks from one of said plurality of DTCP frames by grouping one or more of its plurality of encrypted 16-byte portions into a chunk;

adding HLS padding bytes to the end of said chunk and encrypting said HLS padding bytes, such that said chunk and the encrypted HLS padding bytes form an encrypted chunk;

loading each of said encrypted chunks, and a playlist of said encrypted chunks, to a media proxy server at said secondary device;

loading a DTCP key onto a security proxy server at said secondary device, said DTCP Key having been obtained from said source device; and providing said playlist, each of said encrypted chunks, and said DTCP key to a native media player on said secondary device, such that said native media player follows said playlist to decrypt said encrypted chunks using said DTCP key and plays back said chunks, wherein said playlist includes a value describing the time length of each encrypted chunk, and wherein said time length is determined by using a clock to divide said encrypted DTCP-IP transport stream into said chunks at preselected time intervals.

10. A process for converting a DTCP-IP transport stream into HLS format, comprising:

receiving an encrypted DTCP-IP transport stream at a secondary device from a source device, said encrypted DTCP-IP transport stream comprising a plurality of DTCP frames, each of said plurality of DTCP frames comprising a plurality of encrypted 16-byte portions;

forming chunks from one of said plurality of DTCP frames by grouping one or more of its plurality of encrypted 16-byte portions into a chunk;

adding HLS padding bytes to the end of said chunk and encrypting said HLS padding bytes, such that said chunk and the encrypted HLS padding bytes form an encrypted chunk;

loading each of said encrypted chunks, and a playlist of said encrypted chunks, to a media proxy server at said secondary device;

loading a DTCP key onto a security proxy server at said secondary device, said DTCP Key having been obtained from said source device;

providing said playlist, each of said encrypted chunks, and said DTCP key to a native media player on said secondary device, such that said native media player follows said playlist to decrypt said encrypted chunks using said DTCP key and plays back said chunks; and receiving and storing said encrypted DTCP-IP transport stream in its entirety at local storage within said secondary device, and forming said chunks from the local storage only on a request for playback at a subsequent time.

* * * * *